US006622579B1

United States Patent
Muth et al.

(10) Patent No.: US 6,622,579 B1
(45) Date of Patent: Sep. 23, 2003

(54) BEARING ARRANGEMENT FOR TENSION FORCES AND BEARING HEAD THEREFOR

(75) Inventors: Michael Muth, Munich (DE); Bernd Schulz, Unterhaching (DE)

(73) Assignee: AeroLas GmbH Aerostatische Lager-Lasertechnik, Unterhaching (DE)

( * ) Notice: Subject to any disclaimer, the term of this patent is extended or adjusted under 35 U.S.C. 154(b) by 196 days.

(21) Appl. No.: 09/619,991

(22) Filed: Jul. 20, 2000

(30) Foreign Application Priority Data

Jul. 20, 1999 (DE) .......................... 199 33 379

(51) Int. Cl.⁷ .............................. F16C 32/06
(52) U.S. Cl. ................................ 73/865.6
(58) Field of Search ................... 73/865.6; 384/12, 384/99, 100, 107, 111–114, 121, 123, 124; 248/580, 581, 610, 317, 320, 908

(56) References Cited

U.S. PATENT DOCUMENTS

| 4,860,600 A | | 8/1989 | Schumacher |
| 5,098,203 A | * | 3/1992 | Henderson .................. 384/124 |
| 5,501,114 A | | 3/1996 | Okamoto |

FOREIGN PATENT DOCUMENTS

DE          19501571 A1     9/1996

* cited by examiner

Primary Examiner—Robert Raevis
(74) Attorney, Agent, or Firm—Townsend and Townsend and Crew, LLP (57) ABSTRACT

A bearing arrangement for the support of tensile forces, in particular for the suspended mounting of a mass, in order to simulate the weightlessness of the latter in a gravitational field, has a first bearing element comprising at least one magnet and a second, metallic bearing element, to which the first bearing element is attracted magnetically. At least one of the bearing elements has, in its bearing surface, gas outflow nozzles which are loaded by a compressed gas, so that a gas stream flowing out of the gas outflow nozzles forms a gas cushion between the bearing elements attracting one another due to the magnetic force, said gas cushion keeping the bearing elements at a distance from one another. The magnetic attraction force between the bearing elements is, in this case, equal to the sum of the tensile force exerted by the mass and the first bearing element and of the repulsion force of the gas cushion. A bearing arrangement of this type may be used for the gravity-compensating suspension of a foldable solar panel arrangement for a satellite in a test apparatus for testing the deployment operation in a gravitational field so as to simulate weightlessness or may serve, in general terms, as a low-friction conveying system.

16 Claims, 5 Drawing Sheets

BEARING ARRANGEMENT FOR TENSION FORCES AND BEARING HEAD THEREFOR

BACKGROUND OF THE INVENTION

The invention relates to a bearing arrangement for the support of tensile forces, in particular for the suspended mounting of a mass, in order to simulate the weightlessness of the latter in a gravitational field, the bearing arrangement having a first bearing element comprising at least one magnet and a second, metallic bearing element which is attracted magnetically by a first bearing element.

A bearing arrangement of this type is known, for example, from DE 195 01 571 A1.

The invention relates, furthermore, to a bearing head for the bearing arrangement, with a bearing body into which a magnet is integrated.

Satellites are usually equipped, for the supply of power, with foldable solar panels which, during transport from Earth into orbit, are folded together and rest against the outer casing of the satellite. In orbit, after the satellite has been released, these solar panels are then deployed in a zigzag-like manner by means of a deploying mechanism.

This deployment of the solar panels is critical to the system, since the supply of power to the satellite is not ensured without sufficiently and completely unfolded solar panels, and the satellite then cannot be used at all or can be used only to a restricted extent. The deployment operation therefore has to be simulated on Earth and the corresponding mechanism tested.

For this simulation and for this testing operation, the joints of a solar panel arrangement have hitherto been suspended on a rolling bearing track mounted on the ceiling, the corresponding suspension devices being capable of moving about the vertical axis within the rolling bearing track in the longitudinal and transverse directions and at their suspension point. A fundamentally free movement of the unfolding solar panel arrangement was thereby achieved during the deployment operation. However, frictional forces arise in the rolling bearings both in the longitudinal direction and in the transverse direction and also in the rotary bearing of the suspension and do not allow a completely free movement of the unfolding solar panel arrangement, as is the case under conditions of weightlessness in space. Furthermore, the suspension of the solar panels gives rise, in the region of their joints, to a gravity-induced axial force in the joints which in the joints causes frictional resistances which do not occur under conditions of weightlessness. The suspension of the solar panels of this test apparatus, which is generally known and cannot be vouched for by prior art, is therefore suitable only to a limited degree for ensuring an actual free moveability of the deploying solar panels.

It is not only the above-described operation of deploying solar panels which requires a load suspension system capable of being moved without friction. In many other sectors of manufacturing, assembly or conveying technology it is necessary to move suspended loads virtually without friction in a horizontal plane. This is necessary particularly when highly accurate positioning of the load is to be carried out. Such highly accurate positioning is not possible in transport systems where friction occurs, since, because of the friction, there is always an, albeit only slightly detectable, jolt-like movement of the conveying system.

SUMMARY OF THE INVENTION

It is therefore an object of the present invention to provide a generic bearing arrangement which, on the one hand, reliably supports tensile forces and, on the other hand, allows virtually frictionless movement in one plane and about a vertical axis.

This object is achieved, according to the invention, in that at least one of the bearing elements has, in its bearing surface, gas outflow nozzles which are loaded by a compressed gas, so that a gas stream flowing out of the gas outflow nozzles forms a gas cushion between the bearing elements attracting one another due to the magnetic force, said gas cushion keeping the bearing elements at a distance from one another. The magnetic attraction force between the bearing elements is, in this case, equal to the sum of the tensile force exerted by the mass and the first bearing element and the repulsion force of the gas cushion.

The combination of magnetic retention and compressed gas bearing makes it possible in a reliable way to build up a holding force between the two bearing elements which reliably supports the tensile forces, without a mechanical connection between the two bearing elements being made at the same time.

U.S. Pat. No. 4,860,600 discloses a microgravity simulator, in which air bearings are used to support a mass to be tested. However, in this known arrangement, the air bearings act counter to gravity so that here a standing arrangement, that is to say a compressive force, is supported by the air bearings. However, where very narrow and high masses to be tested are concerned, as is the case, for example, with solar panels, even the least possible lateral deflections can cause tilting forces which may nullify a conventional standing air mounting according to U.S. Pat. No. 4,860,600 due to tilting moments. A standing gas pressure bearing arrangement having the same disadvantages is also known from U.S. Pat. No. 5,501,114.

It is advantageous, in the bearing arrangement according to the invention, that the suspended arrangement of the mass, and therefore the design of the bearing arrangement as a suspended bearing and not as a standing bearing, is relatively immune to deflections even of a thin high mass, since a stable equilibrium always prevails in a suspended mounting, whereas an unstable equilibrium always prevails in a standing mounting.

In an advantageous development, the first, magnet-equipped bearing element also has the gas outflow nozzles for generating the gas cushion. This bearing arrangement is advantageous in manufacturing terms and from a sales point of view, since only one bearing element has to be of a technologically high-quality design, whereas the other bearing element can be designed relatively simply.

It is also advantageous if the first, magnet-equipped bearing element has a plurality of bearing means, and if the second bearing element is formed by an essentially planar metal plate. The provision of a planar metal plate as the second bearing element makes it possible to concentrate the entire functionality of the bearing arrangement according to the invention onto the first, magnet-equipped bearing element.

Preferably, at the same time, the metal plate forming the second bearing element is arranged fixedly, and the first, magnet-equipped bearing means is connected effectively to the mass to be mounted, the bearing means in each case being designed as a bearing head provided with at least one magnet and with gas outflow nozzles.

It is also advantageous if the bearing heads of the first bearing element are pivotably mounted individually on a carrying structure connected effectively to the mass to be mounted. By virtue of this arrangement, any unevennesses in the metal plate and also slight exogenic disturbances exerting a tilting moment on the respective bearing heads can be compensated for, since the individual bearing heads in each case come to bear optimally against the sheet-like bearing element, without an increase in the distance between the two bearing surfaces and consequently a lifting-off of the bearing head from the second bearing element occurring at the same time.

It is particularly advantageous if the bearing heads of the first bearing element are arranged in a row, at least two bearing heads being provided, which in each case are articulated laterally moveably on one end of a balance-beam-like carrying beam, and the carrying beam being pivotably mounted indirectly or directly in the manner of a balance beam on a suspension structure for the mass to be mounted. This design makes it possible to have an ideally uniform distribution of the tensile force to the individual bearing heads and consequently a homogeneous and reliably effective distribution of tensile force over the entire bearing arrangement.

At the same time, it is particularly advantageous if the carrying structure has, in a first plane, an even number of first balance-beam-like carrying beams, at the respective ends of which two bearing heads adjacent to one another are pivotably mounted. It is further advantageous if the carrying structure has, in a second plane, a number of two balance-beam-like carrying beams, at the respective ends of which two first carrying beams adjacent to one another are pivotably mounted in the manner of a balance beam. It is desirable if the carrying structure has, preferably in one or more further planes, balance-beam-like carrying beams, at the respective ends of which two carrying beams, adjacent to one another, of the upper plane are pivotably mounted in the manner of a balance beam, and if the lowest plane has a single last carrying beam which is pivotably mounted in the manner of a balance beam on the suspension structure for the mass to be mounted. This design makes it possible to provide a multiplicity of bearing heads and, at the same time, ensure that each bearing head absorbs the same tensile force. Preferably, the magnets provided are permanent magnets. The advantage of this is that, in the event of a system failure, the mass suspended on the bearing arrangement does not fall down, but instead, due to the attraction force of the permanent magnet, acts on the second bearing element, so that the mass to be held does not fall down during a system failure.

It is also advantageous if at least one magnet is formed by a solenoid. It is thereby possible, for example, to provide a controllable braking device for a moving mass suspended on the bearing arrangement, and, by the solenoid being activated until the compressed gas cushion is overcome and there is physical contact with the second bearing arrangement, a braking action can be achieved by means of a bearing head provided with a solenoid. It is advantageous, in particular, if the attraction force of the solenoid and/or the repulsion force of the gas cushion are capable of being controlled or regulated. As a result, even a dynamic load can be controlled to a limited extent, and, by increasing the force of the solenoid and reducing the repulsion force of the gas cushion, a greater attraction of the bearing arrangement onto the second bearing element can be achieved.

A further object of the invention is to specify a bearing head for a generic mounting, into which bearing head a magnet is integrated.

This object is achieved in that a gas outflow structure is provided around the magnet in the bearing surface of the bearing head.

It is advantageous in this case if the gas outflow structure consists of a multiplicity of gas outflow nozzles arranged around the magnet, and, in particular, micronozzles may be provided, which ensure that a highly effective gas cushion is built up.

Alternatively, however, the gas outflow structure may also have at least one gas outflow nozzle which is fluidly connected to an air distributor structure arranged in a groove-like manner around the magnet.

In a particularly preferred embodiment of the bearing head, the housing is designed to be essentially axially symmetrical, preferably cylindrical, the bearing surface extending orthogonally, preferably all-round orthogonally, to the axis of symmetry of the bearing head, the magnet being arranged coaxially to the axis of symmetry of the bearing head, the inner flux lines of the magnet extending essentially parallel to the axis of symmetry, and the gas outflow nozzles being arranged around the magnet circularly on at least one ring which is likewise placed coaxially to the axis of symmetry. This special rotationally symmetrical design of the entire bearing head is distinguished in that, in the event of a movement, the bearing head does not have any directional priority, so that a movement of the bearing head in any translational direction is possible without obstructions and without preferences.

Alternatively to this, the bearing head may be designed in such a way that the bearing body has, in horizontal projection, a rectangular or trapezoidal form and that the magnet has, likewise in horizontal projection, a rectangular or trapezoidal form. An unequivocal directional preference of the bearing body is thereby afforded, and this may be advantageous if a predetermined direction of the movement of the bearing body is to be defined in a controlled manner, as may be advantageous, for example, in a transport system which uses the bearing arrangement according to the invention.

It is particularly advantageous if the gas outflow nozzles in the bearing surface are formed by microholes which are drilled by means of a high-energy beam and which are of conical form, their narrowest cross-section being located at the issue into the bearing surface. This form of the gas outflow nozzles, which is already known per se from DE 44 36 156 C1, has the advantage that the air consumption of the individual nozzles is extremely low and that a large number of nozzles for a high static carrying force can be introduced into the bearing body, without thereby causing the overall air consumption to rise into uneconomic ranges. In the bearing head according to the invention, this embodiment of the gas outflow nozzles, in conjunction with the magnet provided in the bearing head, provides extremely homogeneous attraction and repulsion of the cooperating bearing elements, so that these have a high reliable carrying capacity.

The bearing arrangement according to the invention, particularly when it is equipped with the bearing heads according to the invention, serves in a preferred use for the gravity-compensating suspension of a foldable solar panel arrangement for a satellite in a test apparatus for testing the deployment operation in a gravitational field so as to simulate weightlessness, at least one bearing arrangement being provided in order to suspend the solar panel arrangement so that it is freely moveable horizontally.

At the same time, it is particularly advantageous if a plurality of bearing arrangements are provided, a bearing arrangement of which in each case mounts one solar panel of the solar panel arrangement consisting of a plurality of solar panels, so as to be freely moveable horizontally in suspension and so as to be freely rotatable about the vertical axis running through the center of gravity of the respective solar panel. In particular, this embodiment makes it possible to ensure a moveability of the individual solar panels which is already frictionless in the suspension and, moreover, to prevent the occurrence of axial forces in the joints connecting the solar panels to one another, so that even in these joints no gravity-induced frictional forces take effect.

In principle, the bearing arrangement according to the invention and, in particular, the bearing heads according to the invention are also suitable for carrying out any other support of a suspended load, so that they can also be used, for example, for a conveying system which moves essentially without friction.

The invention is explained in more detail below by means of an example.

DESCRIPTION OF THE PREFERRED EMBODIMENTS

Figure 1:
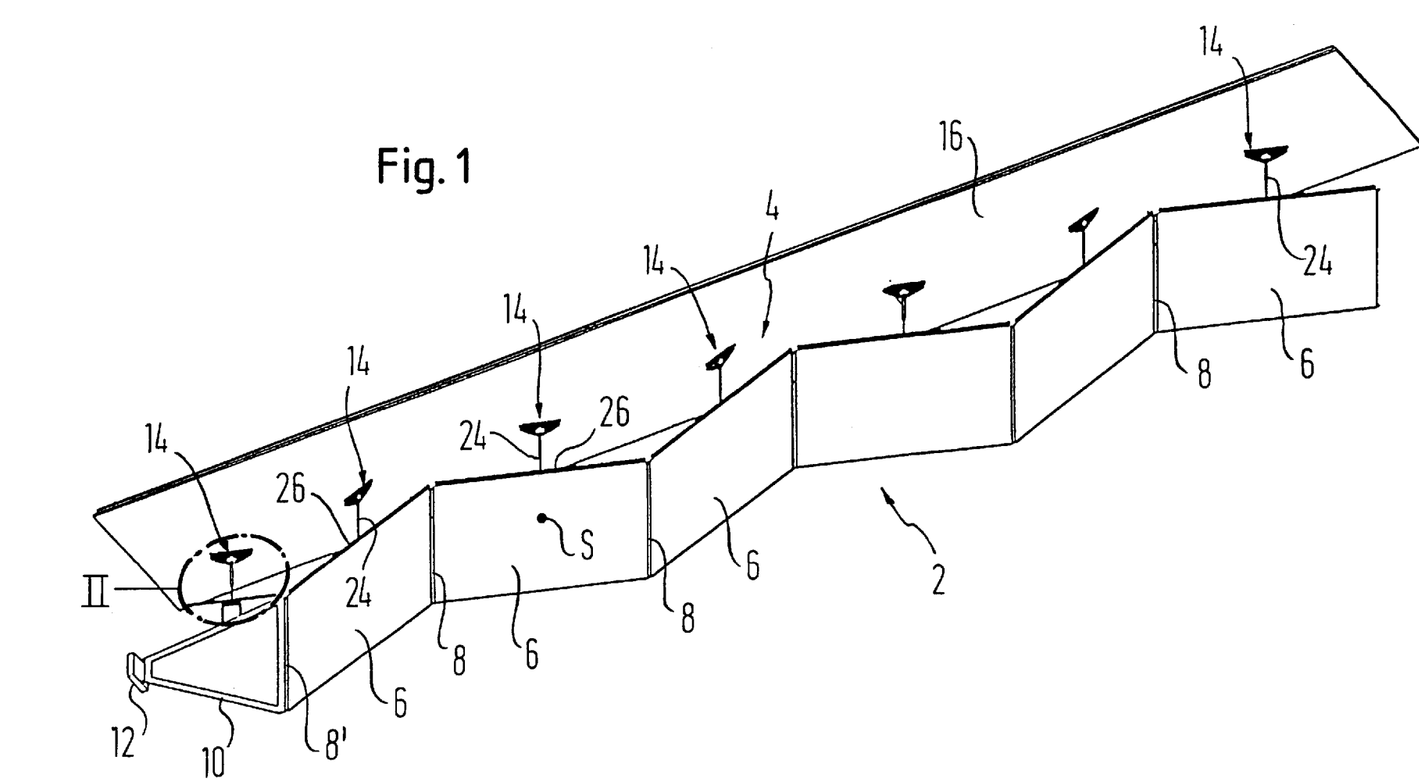
FIG. 1 shows an almost completely deployed solar panel arrangement having a plurality of bearing arrangements according to the invention for suspended mounting.

FIG. 1 shows a solar panel arrangement 2 which is mounted in suspension and so as to be freely moveable horizontally by means of a bearing arrangement 4.

The solar panel arrangement 2 comprises a plurality of solar panels 6 which in each case are connected to one another via hinge-like joints 8 on two vertical sides facing away from one another, so that the solar panel arrangement 2 can be folded together and unfolded in a zigzag-like manner. The first solar panel 6 is connected in an articulated manner, on its vertical side facing away from the joint 8, via a hinge-like joint 8' to a trapezoidal fastening structure 10 which, at its free end, possesses a fastening plate 12 capable of being attached to a satellite (not shown). In a test apparatus, the fastening plate 12 is secured fixedly.

The bearing arrangement 4 comprises a plurality of first bearing elements 14 and a second bearing element 16 cooperating with the first bearing elements 14.

The second bearing element 16 has a planar metal plate extending essentially horizontally.

The first bearing elements 14 each have at least one magnet 18 which, by means of the magnetic force, supports in suspension the associated bearing element 14, the solar panel 6 connected effectively to it and the fastening structure 10 connected effectively to the first bearing element 14, so as to be suspended below the second bearing element 16 having the metal plate. Furthermore, each first bearing element 14 has, in its bearing surface 20, gas outflow nozzles 22 (FIG. 4) which are loaded by a compressed gas, a gas stream which flows out of the gas outflow nozzles 22 forming a gas cushion between the respective first bearing element 14 and the second bearing element 16, said gas cushion keeping the bearing elements 14, 16 at a distance from one another. The gas pressure of the outflowing gas stream is, in this case, set in such a way that the sum of the gas cushion repulsion force caused by said gas pressure and of the tensile force exerted by the mass of the solar panel arrangement 2 and of the first bearing elements 14 is equal to the magnetic attraction force between the bearing elements 14, 16. In this way, the first bearing elements 14, together with the solar panel arrangement 2 attached to them, are held in suspension below the second bearing element 16, without the two bearing elements 14, 16 touching one another. This suspended mounting allows a free moveability of the solar panels 6 of the solar panel arrangement 2 along the second bearing element 16 (that is to say, in this example, in the horizontal direction) and a free moveability about the vertical axis of each first bearing element 14, so that the system described has three degrees of freedom.

Both the magnets 18 and the gas outflow nozzles 22 do not necessarily have to be arranged in the suspended first bearing element, although this is a particularly advantageous refinement of the invention; the gas outflow nozzles and/or the magnets 18 may also be arranged in the plate-like second bearing element 16, in which case an activating means is expediently provided for the gas outflow nozzles 22, said activating means activating only those gas outflow nozzles in the region of which a suspended first bearing element 14 is located.

It can also be seen in FIG. 1 that the first bearing elements 14 are in each case fastened via a vertical tension rod 24 to a horizontal bearer 26 attached to the upper edge of each solar panel 6, the tension rod being mounted vertically above the mass center of gravity S of each solar panel 6. This avoids vertical forces occurring in the hingelike joints 8 connecting the solar panels 6 to one another. A similar design with the same effect for the hinge-like joint 8' is also provided for the suspended mounting of the fastening structure 10.

The design of each bearing element 14 is explained with reference to FIG. 2.

Figure 2:
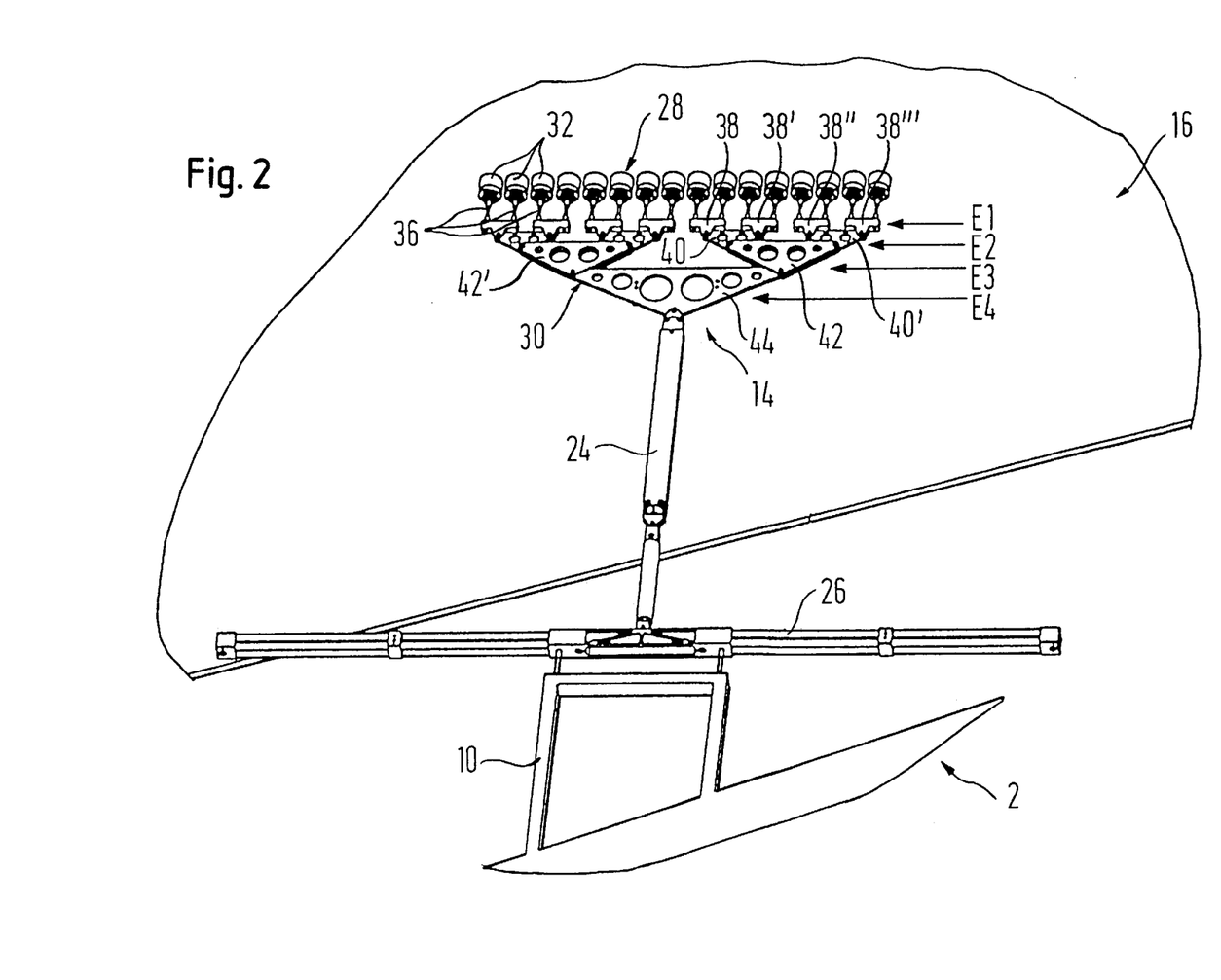
FIG. 2 shows a detail drawing of a bearing arrangement according to the invention, according to the detail II in FIG. 1.

FIG. 2 shows an enlarged view of a first bearing element 14 suspended below the second bearing element 16. The first bearing element 14 comprises, in addition to the tension rod 24 and the horizontal bearer 26 holding the solar panel 6 or, in the example of FIG. 2, the fastening structure 10, a plurality of bearing means 28 and also a carrying structure 30. Each bearing means 28 comprises a bearing head 32 with an upper bearing surface 34 directed toward the second bearing element 16, and also a tension strut 36 attached on the underside facing away from the bearing surface 34. The design of the bearing means 28 is described later with reference to FIGS. 3 and 4.

The carrying structure 30 comprises a multiplicity of carrying beams 38, 38', 38'', 38'''; 40, 40'; 42, 42'; 44 arranged in a plurality of planes E1, E2, E3 and E4 located one above the other. The lowest plane E4 of the carrying structure 30 consists of a balance-beam-like carrying beam 44 which has the contour of an isosceles triangle and which is articulated pivotably on the upper end of the tension rod 24 in the region of the triangle vertex which is formed by the two equal sides. A further carrying beam 42, 42', which is likewise designed in the form of an isosceles triangle, is in each case pivotably mounted, in the region of its vertex formed by the equal sides, on the other two vertices of the carrying beam 44. The two carrying beams 42, 42' form the next higher plane E3 of the carrying structure 30. The arrangement located above the carrying beams 42, 42' is in each case designed identically, so that only the structure located above the carrying beam 42 is described below.

A carrying beam 40, 40' of an upper plane E2 of the carrying structure 30 is in each case pivotably mounted on the two further vertices of the carrying beam 52 in the same way as the carrying beams 42, 42' are mounted on the carrying beam 44. These carrying beams 40, 40' also in each case again mount, at their free vertices, a carrying beam 38, 38' and 38", 38'" of an upper plane E1 pivotably and in the manner of a balance beam in the same way. The carrying beams 38, 38', 38", 38'" also have a design similar to that of the lower balance-beam-like carrying beams, the respective points of articulation being located at the vertices of an imaginary isosceles triangle. The two upper points of articulation of the uppermost carrying beams 38, 38', 38", 38'" in each case pivotably mount the lower end of the tension strut 36 of an associated bearing means 28. The above-described pivoting work of the individual elements, but at least that of the tension struts 36 on the uppermost carrying beams 38, 38', 38", 38'", is not restricted to the direction of the plane formed by the carrying beams, but is also possible transversely to this plane.

This design of the carrying structure 30 ensures that the tensile force introduced into the carrying structure 30 via the tension rod 24 is introduced into the respective bearing means 28 independently of lateral components of the tensile force which possibly act on the tension rod 24, solely in the vertical direction of force, that is to say in the direction of the respective longitudinal axis X of the bearing means 28. For this reason, no tilting forces arise on the bearing surface 34 of each bearing means 28, so that the distance between the bearing surface 34 of the respective bearing means 28 and the downwardly pointing bearing surface of the second bearing element 16 is constant. This ensures that a uniformly thick gas cushion is formed between the respective bearing means 28 and the second, upper bearing element 16, so that the displacement of a bearing surface 34 out of its ideal position and consequently a weakening of the magnetic holding force, and also a collapse of the gas cushion, are reliably avoided. Moreover, this avoids the situation where, if the bearing surface 34 is tilted, an obliquely directed force component of the gas stream flowing out of the gas outflow nozzles causes a lateral movement of the first bearing element 14, so that, as a result of this too, free moveability of the solar panel arrangement 2 suspended on the first bearing element 14 is ensured in the horizontal direction.

Figure 3:
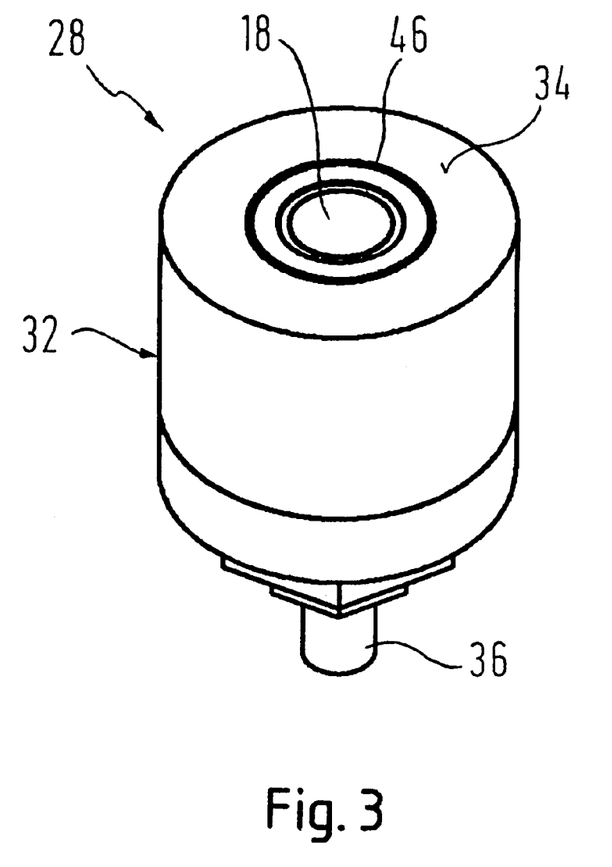
FIG. 3 shows a perspective view of a bearing head of a bearing arrangement according to the invention.

FIG. 3 shows a perspective view of an individual cylindrical bearing means 28 obliquely from above. On the top side of the bearing means 28, the bearing surface 34 can be seen, at the center of which is located the end face of the likewise cylindrically designed permanent magnet 18. A multiplicity of micronozzles 22, as a gas outflow structure 47 for the outflow of the gas stream, are provided, illustrated diagrammatically as a ring 46 in FIG. 3, around the permanent magnet 18.

The design of the bearing means 28 is described below with reference to the vertical section illustrated in FIG. 4.

The bearing means 28 consists of a bearing head 32 and of the tension strut 36. The cylindrical bearing head 32 has a housing 48 which receives the magnet 18 and in which is formed the gas distributor structure for the gas outflow nozzles 22. The housing 48 consists of an upper outer annular casing 50, a lower outer annular casing 52, an upper inner core 54 and a lower inner core 56.

Figure 4:
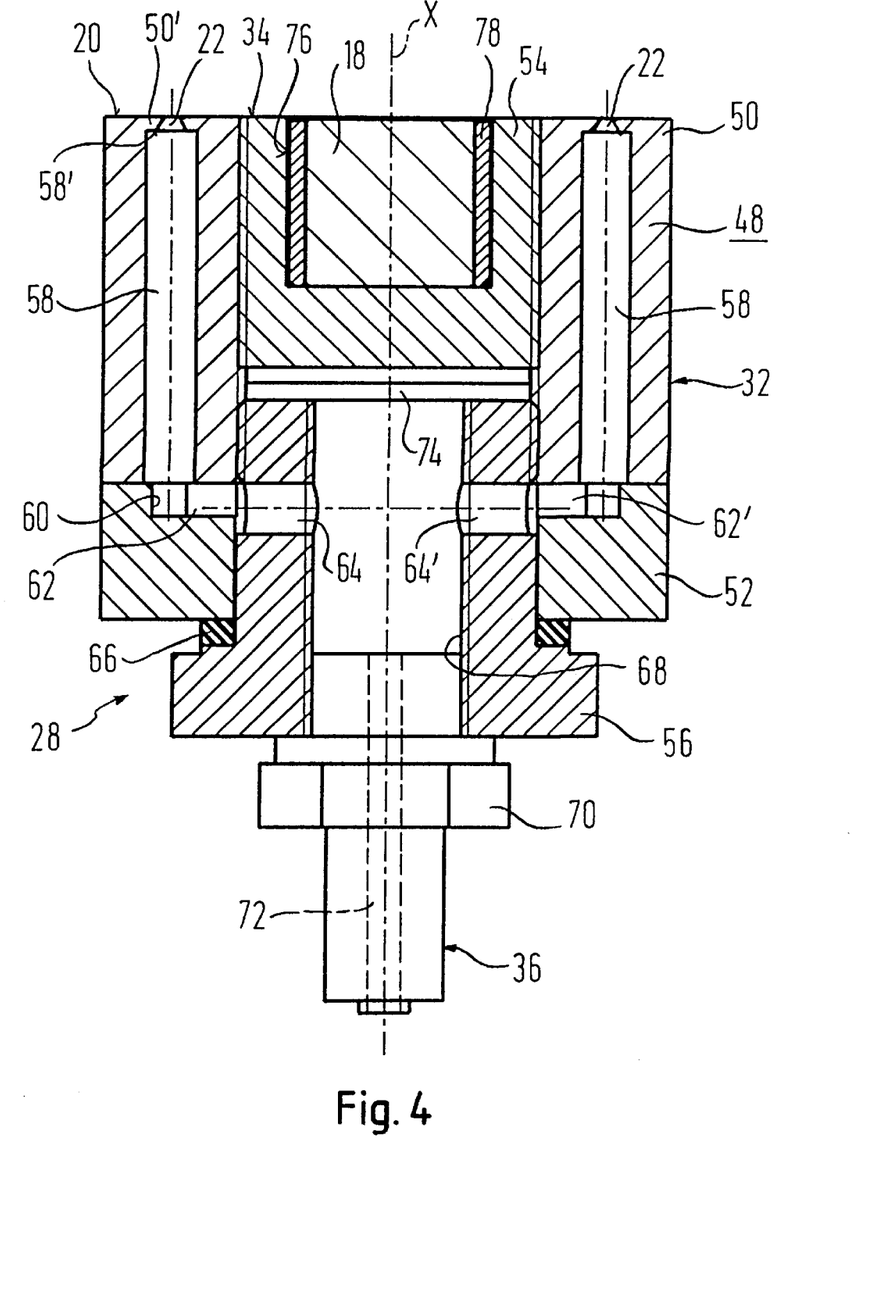
FIG. 4 shows a vertical section through a bearing head according to the invention.

The gas outflow nozzles 22 are formed in the upper outer annular casing 50 in the bearing surface 34 located at the top in FIG. 4. An annular duct 58, which is open toward the lower outer annular casing 52, is provided inside the upper outer annular casing 50 behind the gas outflow nozzles 22.

The lower outer annular casing 52 is provided, on its surface pointing upward to the upper outer annular casing 50, with a groove-like annular duct 60 which, after the two annular casings 50, 52 have been assembled, is fluidly connected to the annular duct 58. Radially inwardly directed radial ducts 62, 62' run from the annular duct 60 of the lower outer annular casing and are fluidly connected to radial ducts 64, 64' in the lower inner core 56 when the latter is inserted into the assembled annular casings 50, 52. The annular casings 50, 52 are joined sealingly to one another in a way known to a person skilled in the art, for example by welding, adhesive bonding, screwing or the like.

The lower inner core 56 is screwed by means of an external thread into an internal thread provided in the inner wall of the unit composed of the upper outer annular casing 50 and of the lower outer annular casing 52, an O-ring seal 66 being inserted between the lower end face of the lower outer annular casing 52 and an upper annular surface of the flange-like lower portion of the lower inner core 56 and ensuring sealing off of the lower inner core 56 and the unit composed of the two annular casings 50, 52.

The lower inner core 56 possesses a central threaded bore 68 which is fluidly connected to the radial ducts 64, 64' in the wall of the lower inner core 56. Screwed into the central threaded bore 68 is a fluid connection piece 70 which is formed at the upper end of the tension strut 36 and which has a supply duct 72 for the compressed gas. The supply duct 72 is provided in a way known per se with a hose connection for a gas supply hose (not shown) which is connected to a compressed gas source (not shown).

The upper inner core 54 is likewise screwed into the threaded interior of the upper outer annular casing 50, at least one sealing plate 74 being provided between the upper inner core 54 and the lower inner core 56. The upper inner core 54 is provided, in the region of its upper end face forming the bearing surface 34, with a central blind-hole bore 76, into which the magnet 18 is inserted and is secured, for example, by means of a grouting compound 78 surrounding the magnet 18. The upper outer annular casing 50, the upper inner core 54, the magnet 18 and the grouting compound 78 together form the planar bearing surface 34 on their top side.

The gas outflow nozzles 22 are designed as micronozzles which are formed by means of a high-energy beam, for example a laser beam, in the thin wall portion 50' between the bearing surface 34 and the bottom surface 58' of the annular duct 58. In this case, as can be seen in FIG. 4, the gas outflow nozzles 22 taper conically from the annular duct 58 toward the bearing surface 34.

The compressed gas introduced into the supply duct 72 enters the central threaded bore 68 of the lower inner core 56 and flows from there through the radial ducts 64, 64' and 62, 62' into the annular duct 60 in the lower outer annular casing 52 and further on into the annular duct 58 in the upper outer annular casing 50, said compressed gas flowing out of the annular duct 58 through the gas outflow nozzles 22.

Figure 5:
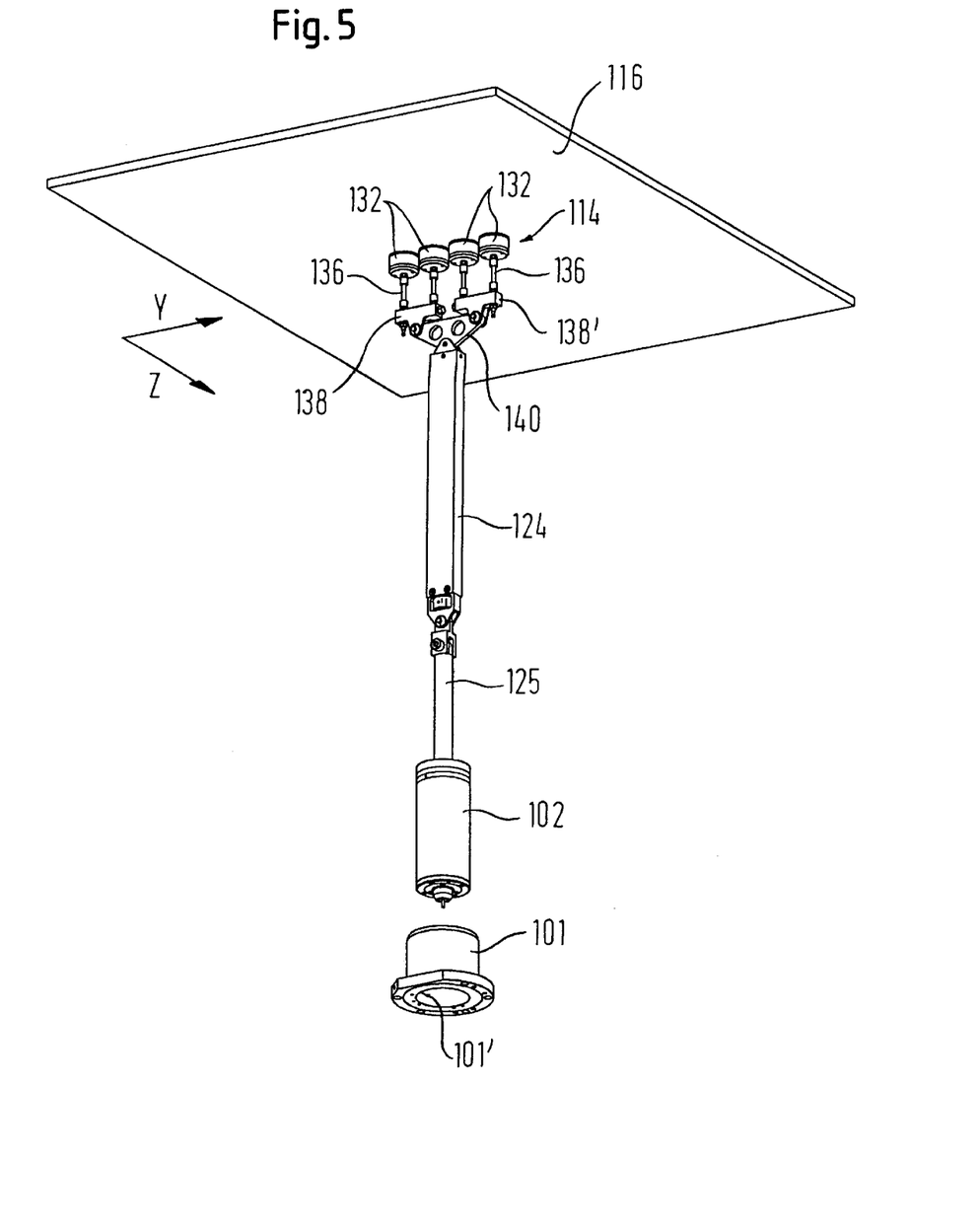
FIG. 5 shows an assembly means capable of being positioned with high accuracy by means of the bearing arrangements according to the invention, in a perspective view obliquely from below.

FIG. 5 shows an example in which the bearing arrangement according to the invention is provided in a load conveying system, by means of which a suspended load can be positioned with high accuracy.

A first bearing element 114 having four bearing heads 132 is suspended in a way already described, as in the first example, by means of magnetic force on a ceiling structure serving as a second bearing element 116. The first bearing element 114 has two carrying beams 138, 138' which are connected at their respective ends, via tension struts 136, to a respectively associated bearing head 132. In the middle, the carrying beams 138, 138' are in each case connected in a pivotably articulated way to the ends of a lower common carrying beam 140 in the manner of a balance beam, and this common carrying beam 140 is pivotably connected at its center in an articulated way to a tension rod 124, at the lower end of which the load 102 is held likewise pivotably via an auxiliary tension rod 125. In the present example, the load 102 consists of a shaft which is to be inserted into a bearing bush 101 illustrated as being free in space in FIG. 5, but in reality secured to an assembly plate.

The first bearing element 114, together with the load 102 suspended on it, is freely moveable, without friction, in the horizontal direction in the plane spanned by the axes Y and Z and formed by the ceiling structure, as has already been described with regard to the first example. A translational drive, not shown in any more detail, for the first bearing element 14 ensures the desired translational movement in the plane spanned by the axes Y and Z.

When the shaft forming the load 102 is placed exactly above the receiving bore 101' of the bearing bush 101 secured on the assembly table, the shaft is lowered into the receiving bore 101' of the bearing bush 101. In order to make this lowering possible, either the tension rod 124 or the auxiliary tension rod 125 is extendable downward telescopically.

For the better positioning of the load at the unloading point reached, the gas stream flowing out of the gas outflow nozzles of the bearing heads 132 can be reduced, so that the magnetic force predominates and an undesirable lateral movement of the first bearing element 114, together with the load suspended on it, is thus avoided.

The invention is not restricted to the above exemplary embodiment, which serves merely for a general explanation of the essential idea of the invention. On the contrary, within the scope of protection, the apparatus according to the invention may also assume embodiments other than those described above.

Reference symbols in the claims, description and drawings serve merely for a better understanding of the invention and are not intended to restrict the scope of protection.

What is claimed is:

1. A bearing arrangement for supporting a suspended load comprising first and second bearing elements, one of the bearing elements including a magnet and the other one of the bearing elements comprising a metal to which the one bearing element attracts itself magnetically, at least one of the bearing elements having a bearing surface with at least one gas outflow nozzle, means for supplying a compressed gas to the outflow nozzle for generating a gas stream exiting from the outflow nozzle that forms a gas cushion between the first and second bearing elements while the elements are attracted to each other by a magnetic force, the gas cushion keeping the bearing elements at a distance from each other, the first bearing element comprising a plurality of bearing heads, a carrying structure for connection to a load that is to be suspended, and a pivotal connection between the bearing heads and the carrying structure for establishing optimal contact between each bearing head and the second bearing element, wherein the at least one gas outflow nozzle is in the first bearing element and each bearing head comprises at least one gas outflow nozzle for generating the gas cushion, wherein each bearing head of the first bearing element includes at least one magnet, and wherein the second bearing element comprises the metal and is substantially planar, wherein the second bearing element comprises a stationary metal plate, wherein at least two bearing heads of the first bearing element are arranged in a row, and further including a pivotable suspension structure forming a balance beam connectable to the load, and a carrying beam pivotally connected to the carrying structure and defining a further balance beam, the at least two bearing heads each being laterally movable on one end of a balance-beam-like carrying beam.

2. The bearing arrangement as claimed in claim 1, wherein the carrying structure has, in a first plane, an even number of first carrying beams each defining balance beams at respective ends of which two bearing heads are pivotably mounted adjacent to one another, wherein the carrying structure has, in a second plane, a number of second carrying beams each defining a balance beam at respective ends of which two first carrying beams are pivotably mounted adjacent to one another to define balance beams, wherein the carrying structure has in at least one further plane further carrying beams defining balance beams at respective ends of which two second carrying beams are pivotably mounted adjacent to one another to define balance beams, and wherein there is a single last carrying beam pivotably mounted on the carrying structure for the load.

3. The bearing arrangement as claimed in claim 1, wherein the magnet comprises a permanent magnet.

4. The bearing arrangement as claimed in claim 1, wherein the magnet comprises a solenoid.

5. The bearing arrangement as claimed in claim 4, wherein at least one of an attraction force generated by the solenoid and a repulsion force generated by the gas cushion is capable of being controlled.

6. In a bearing arrangement for supporting a suspended load having first and second bearing elements, one of the bearing elements including a magnet and the other one of the bearing elements having a metal to which the one bearing element attracts itself magnetically, at least one of the bearing elements having a bearing surface with a gas outflow structure comprising a plurality of gas outflow nozzles arranged about the magnet, means for supplying a compressed gas to the outflow structure for generating a gas stream exiting from the outflow structure that forms a gas cushion between the first and second bearing elements while the elements are attracted to each other by a magnetic force, the gas cushion keeping the bearing elements at a distance from each other, the first bearing element comprising a plurality of bearing heads, a carrying structure for connection to a load that is to be suspended, and a pivotal connection between the bearing heads and the carrying structure for establishing optimal contact between each bearing head and the second bearing element, the improvement to the bearing heads comprising a housing, into which the magnet is integrated, the housing defining the bearing surface of the bearing head, the outflow structure being provided in the bearing surface and extending about the magnet, and a groove in the housing extending about the magnet, the gas outflow structure comprising the at least one gas outflow nozzle being fluidly connected to the groove.

7. The bearing head as claimed in claim 6, wherein the housing is axially symmetrical and the bearing surface extends orthogonally to an axis of symmetry of the bearing head, wherein the magnet is arranged coaxially to the axis of symmetry and inner flux lines of the magnet extend substantially parallel to the axis of symmetry, and wherein the gas outflow structure comprises a plurality of gas outflow nozzles which are circularly arranged about the magnet in at least one ring which is coaxial to the axis of symmetry.

8. The bearing head as claimed in claim 6, wherein the bearing head has, in horizontal projection, one of a rectangular and a trapezoidal shape, and wherein the magnet has, in horizontal projection, one of a rectangular and a trapezoidal shape.

9. The bearing head as claimed in claim 6, wherein the gas outflow structure defines outflow nozzles in the bearing comprising microholes having a conical form which converges towards the bearing surface so that the smallest cross-section of the microholes is located at the bearing surface.

10. The bearing head as claimed in claim 6, wherein the housing is cylindrical.

11. The bearing head as claimed in claim 6, wherein the bearing surface extends all-round orthogonally.

12. In a bearing arrangement for supporting a suspended load having first and second bearing elements, one of the bearing elements including a magnet and the other one of the bearing elements having a metal to which the one bearing element attracts itself magnetically, at least one of the bearing elements having a bearing surface with a gas outflow structure, means for supplying a compressed gas to the outflow structure for generating a gas stream exiting from the outflow structure that forms a gas cushion between the first and second bearing elements while the elements are attracted to each other by a magnetic force, the gas cushion keeping the bearing elements at a distance from each other, the first bearing element comprising a plurality of bearing heads, a carrying structure for connection to a load that is to be suspended, and a pivotal connection between the bearing heads and the carrying structure for establishing optimal contact between each bearing head and the second bearing element, the improvement to the bearing heads comprising a housing, into which the magnet is integrated, the housing defining the bearing surface of the bearing head and the outflow structure being provided in the bearing surface and extending about the magnet, the housing being axially symmetrical and the bearing surface extending orthogonally to an axis of symmetry of the bearing head, the magnet being arranged coaxially to the axis of symmetry and inner flux lines of the magnet extending substantially parallel to the axis of symmetry, the gas outflow structure comprising a plurality of gas outflow nozzles which are circularly arranged about the magnet in at least one ring which is coaxial to the axis of symmetry.

13. The bearing head as claimed in claim 12, wherein the bearing head has, in horizontal projection, one of a rectangular and a trapezoidal shape, and wherein the magnet has, in horizontal projection, one of a rectangular shape and a trapezoidal shape.

14. The bearing head as claimed in claim 12, wherein the gas outflow structure defines outflow nozzles in the bearing comprising microholes having a conical form which converges towards the bearing surface so that a smallest cross-section of the microholes is located at the bearing surface.

15. The bearing head as claimed in claim 12, wherein the housing is cylindrical.

16. The bearing head as claimed in claim 12, wherein the bearing surface extends all-round orthogonally.

\* \* \* \* \*